A. E. KROGER.
Harvester.
No. 13,524.
Patented Sept. 4, 1855.
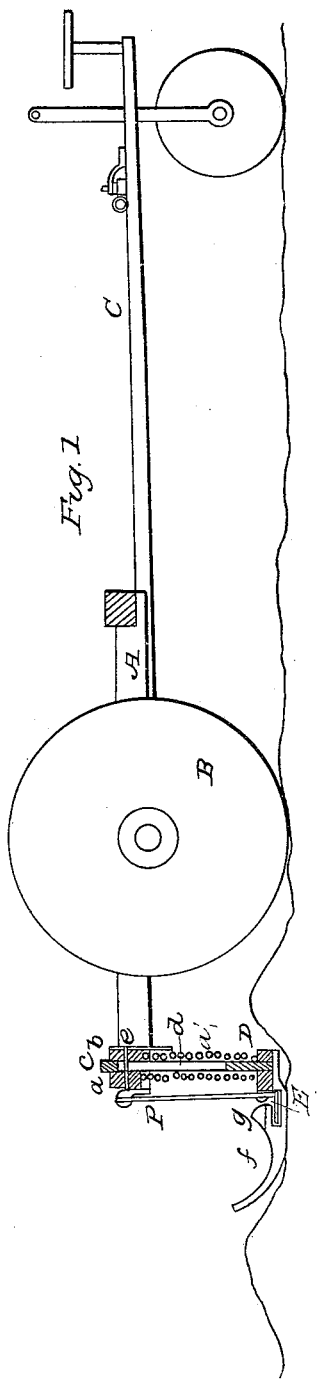
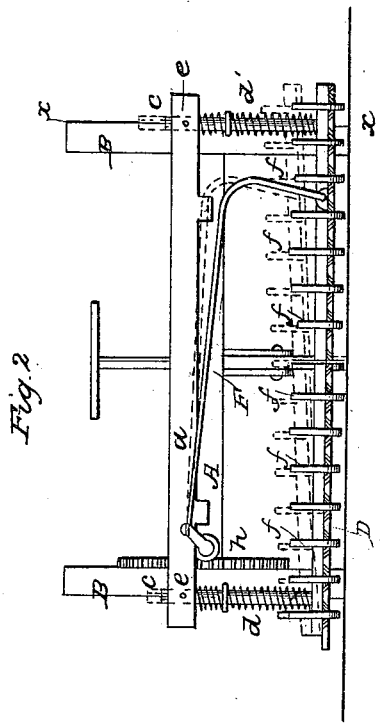

UNITED STATES PATENT OFFICE.

A. E. KRÖGER, OF NORWALK, CONNECTICUT.

IMPROVEMENT IN HARVESTERS.

Specification forming part of Letters Patent No. 13,524, dated September 4, 1855.

*To all whom it may concern:*

Be it known that I, A. E. KRÖGER, of Norwalk, in the county of Fairfield and State of Connecticut, have invented a new and Improved Grain and Grass Harvester; and I do hereby declare that the following is a full, clear, and exact description of the same, reference being had to the annexed drawings, making a part of this specification, in which—

Figure 1 is a side view of my improvement, the sickle-bar and front bar of the frame being bisected, as indicated by the line $x$ $x$, Fig. 2. Fig. 2 is a front view of the same.

Similar letters of reference indicate corresponding parts in the two figures.

The nature of my invention consists in the peculiar mode of attaching or connecting the finger-bar to the front bar of the frame of the machine, whereby the finger-bar and sickle are allowed to yield or give, so as to rise and pass over obstructions that may lie in the path of the machine, and also immediately fall or resume their original position when they have passed over the obstructions.

To enable others skilled in the art to fully understand and construct my invention, I will proceed to describe it.

A represents a rectangular frame, supported by two wheels, B B; and C represents the draft-pole or tongue, which is attached to the back part of the machine, the frame A being in front of the horses. The front bar, $a$, of the frame A has a hole, $b$, made through each end, in which vertical rods $c$ pass, said rods having longitudinal slots $d$ made through them, in which pins $e$ fit, said pins passing transversely through the ends of the bar $a$. The rods $c$ $c$ are allowed to work freely up and down within the holes $b$.

To the lower end of the rods $c$ $c$ the finger-bar D is secured, the lower ends of the rods being firmly secured to the ends of the finger-bar, and around the rods $c$ $c$ there are placed spiral springs $d'$ $d'$, the upper ends of which bear against the under surface of the front bar, $a$, of the frame A, and the lower ends against the upper surface of the finger-bar D, the springs having a tendency to keep the finger-bar depressed.

To the finger-bar D fingers $f$ $f$ are attached. These fingers are placed at suitable distances apart, and are curved upward at their outer ends, as shown clearly in Fig. 1. The inner ends of the fingers have slots $g$ made in them, in which slots the sickle E fits and works. The sickle is of usual construction, having triangular or saw shaped teeth, and has the usual reciprocating motion communicated to it by means of a connecting-rod, F, which is operated by gearing $h$ from one of the wheels B in the ordinary way.

Operation: As the machine is drawn along the lower or under edges of the fingers rest upon the ground. The grass or grain is cut by the sickle in the usual way. The fingers, by being curved as shown, will pass or slide over obstructions, and as the finger-bar is attached to the lower ends of the rods $c$ $c$, which are allowed to slide in the holes $b$ in the front bar, $a$, of the frame A, and as these rods $c$ are encompassed by the springs $d'$, either end of the finger-bar and sickle may be raised, according to which end of the finger-bar the obstruction may be under. If the obstruction is underneath the center of the finger-bar, the bar will be raised horizontally. The bar descends or is forced down to its original position, when it has passed over the obstruction, by the springs $d'$.

The above machine may be used on rough ground, and will operate well where the machines in use cannot be employed advantageously. Its action is quick, the finger-bar yielding readily, rising and falling at the proper time, so as to pass over obstructions without leaving a large surface of grass or grain uncut.

Having thus described my invention, what I claim as new, and desire to secure by Letters Patent, is—

Attaching the finger-bar D to the front bar, $a$, of the frame A by means of the rods $c$ $e$, which slide through the ends of the bar $a$, the rods $c$ $c$ being encompassed by springs $d'$ $d'$, substantially as shown, for the purpose set forth.

A. E. KRÖGER.

Witnesses:
I. T. KRÖGER,
THOS. B. BUTLER.